United States Patent [19]

Mitra et al.

[11] Patent Number: 4,705,693

[45] Date of Patent: Nov. 10, 1987

[54] VEGETABLE FOOD PATTIE COMPOSITION AND PROCESS

[76] Inventors: Gayatri Mitra; Grihapati Mitra, both of 161 Price St., Kingston, Pa. 18704

[21] Appl. No.: 779,425

[22] Filed: Sep. 24, 1985

[51] Int. Cl.$^4$ .................................................. A23L 1/20
[52] U.S. Cl. ..................................... 426/629; 426/634; 426/541
[58] Field of Search ............... 426/629, 634, 633, 638, 426/541, 656, 549, 335

[56] References Cited

U.S. PATENT DOCUMENTS 1,018,462  2/1912  Warner ............................... 426/629
4,124,727  11/1978  Rockland et al. ................... 426/634

Primary Examiner—Raymond N. Jones
Assistant Examiner—Marianne M. Cintins
Attorney, Agent, or Firm—Anthony J. Dixon, Jr.

[57] ABSTRACT

A vegetable material and a process for preparing the same is disclosed which is usable as a precooked pattie or filler and contains a main body of beans or peas, a filler material such as flour or potato, a selection of spices or condiments and a preservative combined to form a composition of matter which form a nutritious, tasty food which can be formed into a pattie without the need for extensive pretreatment by steaming, boiling or pan frying.

5 Claims, No Drawings

VEGETABLE FOOD PATTIE COMPOSITION AND PROCESS

BACKGROUND OF THE INVENTION

1. Field of the Invention

The present invention relates to the preparation and composition of vegetable food products.

More particularly the present invention relates to the process for preparation and the product comprising various types of peas and beans formed into frozen or precooked patties or filler materials for comsumption by humans as a substitute for animal protein.

2. Description of the Prior Art

Various vegetable materials have long been known as suppliers of proteins and amino acids. These matertals have the added advantage of not containing appreciable amounts of fat or cholesterol.

Unfortunately, these materials have long suffered the drawbacks of a less than satisfactory taste which reduces their acceptability to many consumers. For example, soy beans have a distinct fishy odor whereas pea flour is bitter. Other leguminous products have distinct "beany" flavors.

A process for removal of some of these drawbacks was disclosed by Frederick W. Comer in U.S. Pat. No. 4,022,919 issued in 1977 wherein the bitter flavor of pea flour is removed by contacting the flour with steam over time. The drawbacks of such a procedure is that the removal of the flavor ingredients removes essentially all flavor and color which must be artificially added back. Prolonged cooking of beans and lentils and subsequent addition of various flavor ingredients also accomplish this purpose. Yet a preparation for a quickly prepared food from the natural ingredients without these steps is not disclosed in the art.

A snack item prepared from Legume seeds is disclosed by Kon and Dunlap in U.S. Pat. No. 4,084,016 issued Apr. 11, 1978. However, it is limited to a type of chip created by pan frying the material in an edible oil to obtain a desired color, texture, flour and moisture content.

Thus the art has not provided a fast food preparation which can be formed into a pattie made from strictly natural ingredients which has a palatable odor without extensive odor removal steps being required. Condiments are added to enhance the flavor and taste while providing a natural, wholesome proteinous material.

SUMMARY OF THE INVENTION

It is therefore an object of the present invention to provide a precooked or frozen vegetarian pattie or filler material without the need to engage in extensive pretreatment by steaming, boiling or pan-frying.

It is further an object of the present invention to provide a substitute for beef, pork and chicken as principal suppliers of proteins in the average diet of most human consumers.

It is a further object of the present invention to provide a pattie which simulates a fish pattie without the drawback of fishy odor in the left-over portion thereby enhancing the useability of the present invention.

It is a further object of the present invention to provide a low cost protein substitute, said low cost both in material and preparation.

It is a further object of the present invention to provide a totally natural food which is kind to the palate of the consumer.

It is further an object of the present invention to provide easily prepared nutritious food which accommodates the lifestyle of many consumers while reducing the cost of protein in their diet.

Further, it is an object of the present invention to provide a new food to a generation of consumers who will live longer than their predecessors.

These and other objects and advantages are achieved by the present invention which comprises both a process and a composition of matter created by that process. The process comprises:

a. subjecting peas, lentils and beans to boiling until soft
b. draining the beans, peas and lentils
c. combining the peas, beans and lentils into a paste
d. combining the paste of step c with a filler material, spices and a preservative to form a homogeneous mixture
e. forming the mixture into patties
f. covering said patties with crumbs.

The composition of the present invention comprises five main categories of ingredients, those comprising a. main body which is a mixture of beans and peas. The dried beans and peas will constitute from about one-fifth to about one-sixth of the total weight of the final food. Three, four or five types of beans mixed together to make paste. They are selected from the group consisting of urad bean, toor pea, mung bean, chick pea, black eye pea, split pea (matar pea), naval bean, italian bean, pinto bean, brown bean, and lentils.
b. a filler material added to help in developing the taste and to act as binders. In contrast to the raw animal proteinous substance, vegetable protein paste contains hardly any grease or fat and they need fillers as selected from the group consisting of potatoes, flour, corn starch, graham flour, rice flour and whole wheat flour.
c. spices are required to attain the desired end product and include cloves, curry powder, cumin, fenugreek, black pepper, garlic, coriander, turmeric, ginger, cinnamon, nutmeg, black caraway seed, cardamon seed, and saffron.
d. minor ingredients are responsible for creating a good synergic effect with the spices, since the taste and the odor of the food depend heavily on the spices and on these minor ingredients. They are selected from the group consisting of onion, chili, green chili or mango, celery, tomato, honey, sugar and salt.
e. preservatives include antioxidant, ph control and leavening agents such as acetic acid, ascorbic acid, citric acid and tartaric acid added to the paste in their naturally obtainable form.

The objects, advantages, process and composition to be claimed herein are more readily understandable upon review of the preferred embodiment which follows:

THE PREFERRED EMBODIMENT

The present process is described in relation to making an acceptable and usable pattie.

The starting materials are dry beans, lentils and peas. Depending on the particular recipe each of these materials is initially subjected to boiling in water for about twenty (20) minutes or until the material becomes soft enough to form into a paste. The materials are then removed, at times drained and mixed together to form a paste. The paste is of a consistency that can be formed into a pattie by an automatic pattie machine as is now used for hamburger patties formation. To date, vegetable materials have been limited to chips, nuggets and the like. The water content will be about fifty percent (50%) by weight in the desired paste. The dried beans and peas will be of about one-fifth to one-sixth of the final product by weight. Various beans can be used such as urad bean, toor pea, mung bean, chick pea, black eye pea, split pea, naval bean, italian bean, pinto bean, brown bean and lentil.

Next a filler is added which adds to the taste as well as a binder in the pattie product. Since vegetable protein paste contains hardly any grease or fat, this ingredient is necessary. A main advantage of the present composition is the pattie formation ability inherent in it. Flour and potatoes are excellent fillers as well as corn starch, graham flour, rice flour and whole wheat flour. Fillers are added in an amount necessary for taste and consistency. Usually they will comprise twenty-four percent (24%) by weight of the final product.

Next, spices are added. These include cloves, curry powder, cumin, fenugreek, black pepper, garlic, coriander, turneric, ginger, cinnamon, nutmeg, black caraway seed, cardamon seed and saffron.

Addition of onion, green chili, mango, celery, tomato, honey, sugar and salt also are envisioned.

Lastly, preservatives to provide antioxidant, ph control and leavening are added. Naturally obtainable acids such as acetic, ascorbic, citric and tartaric are contemplated.

Three main types of patties have been prepared by the present process. They are labelled green, blue and red. The green label or first composition comprises the following:

---

1. Main body:
   - Black eye pea (dry)    ½ cup
   - Baby Lima beans        ¼ cup
   - Chick pea (dry)        ¾ cup
   - Yellow split pea (dry) ¾ cup
2. Filler:
   - Potato flakes          1½ cup
   - Flour                  ½ cup
   - Corn starch            1 teaspoon
3. Spices:
   - Garlic, cumin, ginger, coriander, turmeric, fenugreek, black peper, cloves, celery powder, cayenne pepper, caraway powder, mace, cinnamon
4. Minor ingredients:
   - Tomato paste, chopped onion, chopped mango, pepper, salt, sugar or honey, or corn syrup, butter or margarine, or vegetable oil.
5. Preservatives:
   - Citric acid, vinegar, ascorbic acid, and tartaric acid.

---

The second composition or blue label comprises the following:

---

1. Main Body:
   - Naval bean (dry)   ½ cup
   - Pinto bean         ½ cup
   - Chick pea          ¾ cup
   - Red kidney bean    ¾ cup
2. Filler:
   - Potato flakes      1½ cup
   - Flour              ½ cup
   - Corn starch        1 teaspoon
3. Spices:
   - Basically the same as in green label, cayenne pepper is not used and the amount of cinnamon powder is slightly more. A pinch of saffron powder is added.
4. Minor ingredients:
   - Basically same as in the green label but proportions vary.
5. Preservatives:
   - Same as in green label.

---

The third composition or red label comprises the following:

---

1. Main body:
   - Red lentils
   - Toor pea
   - Split pea (yellow)
   - Chick pea
2. Filler:
   - Potato flakes
   - Tapioca
   - Flour
3. Spices:
   - Slightly more cayenne pepper and black pepper than in the green label.
4. Minor ingredients:
   - Green chili is substituted for mango pepper.

---

On the contrary, other products now in the market place contain the following:

| Product | Serving | Water | Protein | Fat | Carbohydrates | Ash | Fiber |
|---|---|---|---|---|---|---|---|
| Standard Hamburger | 100 | 50.6 | 21.8 | 8.0 | 16.6 | 2.6 | 0.4 |
| Frysticks | 100 | 69.3 | 16.2 | 4.6 | 6.9 | 2.2 | 0.8 |
| Vegetarian Cutlets | 100 | 79.1 | 15.1 | 1.5 | 2.8 | 1.4 | 0.1 |
| Chicken Cutlets | 100 | 54.8 | 21.4 | 18.5 | 2.7 | 2.6 | 2.6 |
| Fried Chicken Style | 100 | 75.3 | 10.7 | 8.0 | 4.4 | 1.7 | 0.07 |

(1) The Chemicals We Eat, Dr. Melvin A. Benarde American Heritage Press, N.Y. 1971.

The products of the present invention are a tasty pattie that can be substituted for a meat or fish pattie in the daily diet. They can be precooked and frozen or frozen and cooked when desired. They are easily prepared by conventional or microwave cooking and can be an important and tasty diet alternative.

I claim as my invention:

1. A process for preparing an edible vegetable pattie product consisting essentially of:
   a. combining beans selected from the group consisting of lima beans, naval beans, pinto beans, kidney beans and red lentil beans and peas selected from the group consisting of black-eyed peas, chick peas, yellow split peas and toor peas in proportion of from about one part beans to one part peas to about one part beans to three parts peas;
   b. boiling the combination of (a) in water until said peas and beans are soft;

c. forming the resultant soft pea and bean mixture into a paste wherein the water content is about fifty percent (50%) by weight and whereby the composition is suitable for pattie formation;

d. adding a filler to the paste in a proportion less than about twenty-four percent (24%) by weight to form a second paste;

e. adding spices to the second paste to form a third paste;

f. adding an antioxident preservative to the third paste to form a resultant combination;

g. mixing the resultant combination to form a homogeneous mixture;

h. forming the homogeneous mixture of step (g) into a pattie.

2. An edible vegetable pattie product produced by the process of claim 1 wherein:
   a. said beans and peas are in the following proporation by volume;
      one part lima bean
      two parts black-eyed peas
      three parts chick peas
      three parts yellow split peas;
   b. said filler is comprised of one part flour by volume, three parts potato flakes by volume and less than one part corn starch by volume;
   c. said spices are garlic, cumin, ginger, coriander, turneric, fenugreek, black pepper, cloves, celery powder, cayenne pepper, carawy powder, mace and cinnamon; and
   d. said preservative is citric acid.

3. An edible vegetable pattie product produced by the process of claim 1 wherein:
   a. said beans and peas are in the following proportions by volume:
      two parts naval bean
      two parts pinto bean
      three parts chick pea
      three parts red kidney beans;
   b. said filler is comprised of one part flour by volume, three parts potato flakes by volume and less than one part corn starch by volume;
   c. said spices are garlic, cumin, ginger, coriander, turneric, fenugreek, black pepper, cloves, celery powder, saffron powder, caraway powder, mace and cinnamon; and
   d. said preservative is citric acid.

4. An edible vegetable product produced by the process of claim 1 wherein:
   a. said beans and peas are in the following proportions by volume:
      One part red lentils
      One part toor pea
      One part yellow split pea
      Three parts chick pea;
   b. said filler is comprised of one part flour by volume, three parts potato flakes by volume, and less than one part corn starch by volume;
   c. said spices are garlic, cumin, ginger, coriander, turneric, fenugreek, black pepper, cloves, celery powder, saffron powder, caraway powder, mace and cinnamon.

5. The process of claim 1 wherein pattie formation is by an automatic pattie machine.

* * * * *